United States Patent
David et al.

(10) Patent No.: US 8,738,937 B2
(45) Date of Patent: May 27, 2014

(54) METHOD AND APPARATUS TO LIMIT MEMORY POWER

(75) Inventors: Howard S. David, Portland, OR (US); Eugene Gorbatov, Hillboro, OR (US); Ulf R. Hanebutte, Gig Harbor, WA (US); Minh Le, North Plains, OR (US); Rahul Khanna, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 281 days.

(21) Appl. No.: 12/835,080

(22) Filed: Jul. 13, 2010

(65) Prior Publication Data
US 2012/0017099 A1 Jan. 19, 2012

(51) Int. Cl.
*G06F 1/00* (2006.01)
(52) U.S. Cl.
USPC .......................................... 713/300
(58) Field of Classification Search
USPC .......................................... 713/300
See application file for complete search history.

(56) References Cited

U.S. PATENT DOCUMENTS

| | | | | |
|---|---|---|---|---|
| 4,137,563 A | * | 1/1979 | Tsunoda | 713/601 |
| 2001/0011356 A1 | * | 8/2001 | Lee et al. | 713/322 |
| 2005/0125702 A1 | * | 6/2005 | Huang et al. | 713/320 |
| 2006/0031717 A1 | * | 2/2006 | Blanchard et al. | 714/37 |
| 2007/0234100 A1 | * | 10/2007 | Baker et al. | 713/600 |
| 2008/0082844 A1 | * | 4/2008 | Ghiasi et al. | 713/323 |
| 2009/0138219 A1 | * | 5/2009 | Bletsch et al. | 702/60 |
| 2009/0210654 A1 | * | 8/2009 | Koul et al. | 712/25 |
| 2010/0023653 A1 | * | 1/2010 | Rozen et al. | 710/28 |
| 2010/0138684 A1 | * | 6/2010 | Kim et al. | 713/601 |
| 2011/0022857 A1 | * | 1/2011 | Nussbaum et al. | 713/300 |

* cited by examiner

*Primary Examiner* — Nimesh G Patel
(74) *Attorney, Agent, or Firm* — Blakely, Sokoloff, Taylor & Zafman LLP

(57) ABSTRACT

In one embodiment, the present invention includes a power manager to receive a memory power usage value, to determine an available power based at least in part on a power budget and the memory power usage value, and to change a memory power state based at least in part on the available power, wherein the memory power state comprises a memory frequency and a memory voltage. Other embodiments are described and claimed.

18 Claims, 4 Drawing Sheets

METHOD AND APPARATUS TO LIMIT MEMORY POWER

BACKGROUND

Power limiting has become a first order control in power constrained datacenter environments. Platform power limiting is used to manage datacenter capacity, power profile and thermal characteristics. The focus of power budgeting and power limiting technologies has been primarily on the CPU, particularly controlling its P and T states to achieve a specified power limit, for example through dynamic voltage and frequency scaling.

DETAILED DESCRIPTION

In various embodiments, memory power may be limited. In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
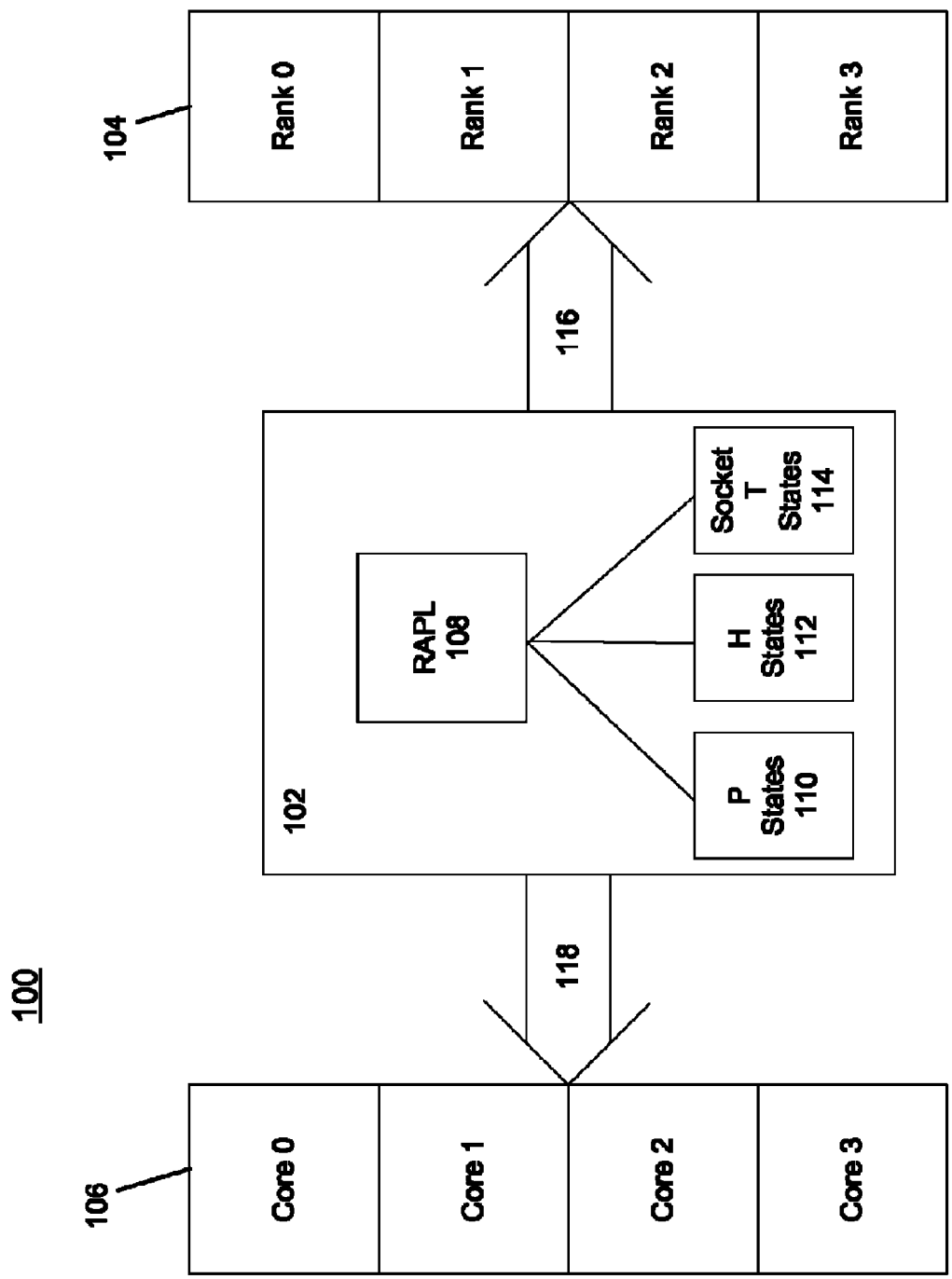
FIG. 1 is a block diagram of an example power manager configuration in accordance with one embodiment of the present invention.

Referring now to FIG. 1, shown is a block diagram of an example power manager configuration in accordance with one embodiment of the present invention. As shown in FIG. 1, configuration 100 may include power manager 102, memory 104 and processor 106. Power manager 102 may include a running average power limit (RAPL) 108, which may utilize various power states, as described in greater detail hereinafter, to control power consumption by memory 104 and processor 106 in a coordinated manner, through interfaces 116 and 118, respectively. Power manager 102 may also control power consumption of other silicon not shown.

Memory 104 is meant to represent any type of memory and while typically containing dynamic random access memory (DRAM), static random access memory (SRAM) or read only memory (ROM) may also be used. Memory 104 may be physically or logically grouped into ranks, which may be separately controllable by power manager 102. While shown as including four ranks, memory 104 may include any number of ranks.

Processor 106 is meant to represent any type of processor and may include any number of cores, which may be separately controllable by power manager 102. While shown as including four cores, processor 106 may include any number of cores. Processor 106 cores may or may not be associated with particular ranks of memory 104. Processor 106 may also include other components and controllers not shown and may comprise a system on a chip (SoC).

Figures 3, 4:
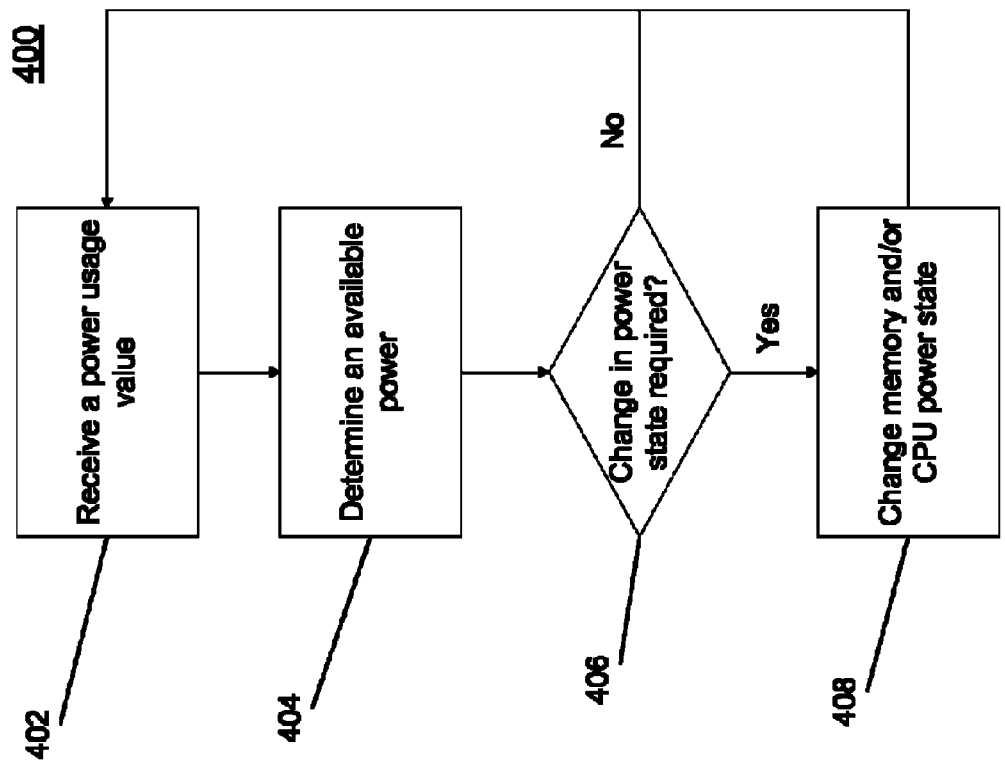
FIG. 3 is a table of example power states used by a power manager in accordance with an embodiment of the present invention.
FIG. 4 is a flow chart of an example method for limiting system power in accordance with an embodiment of the present invention.

RAPL 108, of power manager 102, may have several predefined power states (for example, as shown in FIG. 3) available for processor 106 and memory 104. For a given window of time, RAPL 108 may receive a power usage, compute an available power to stay within an average power usage, determine an appropriate power state based on the available power, and set configuration registers to implement the chosen power state. A RAPL power state may include a combination of a P state 110, an H state 112, and a socket T state 114.

In one embodiment, P states 110 represent a plurality of voltage and frequency level combinations to which processor 106 (or cores within) may be set. In another embodiment, P states 110 may include other throttling techniques. As used herein, H states 112 represent a plurality of voltage and frequency level combinations to which memory 104 (or ranks within) may be set. In one embodiment, H states 112 may include other throttling techniques, such as changing timing settings. In one embodiment, socket T states 114 represent a plurality of energy efficiency levels that throttle functionality of memory 104 and/or processor 106. In one embodiment, socket T states 114 may place various ranks of memory 104 into self refresh. In one embodiment, for example where configuration 100 includes multiple processors 106, socket T states 114 may be coordinated across various sockets through higher level platform T states (not shown). RAPL 108 may also be able to change power states for other system components not shown.

Interfaces 116 and 118 represent the signals and controls necessary to change power states of memory 104 and processor 106, respectively. Interfaces 116 and 118 may include, for example, input signals, output signals, control signals, clocks, voltages, and so on.

Figure 2:
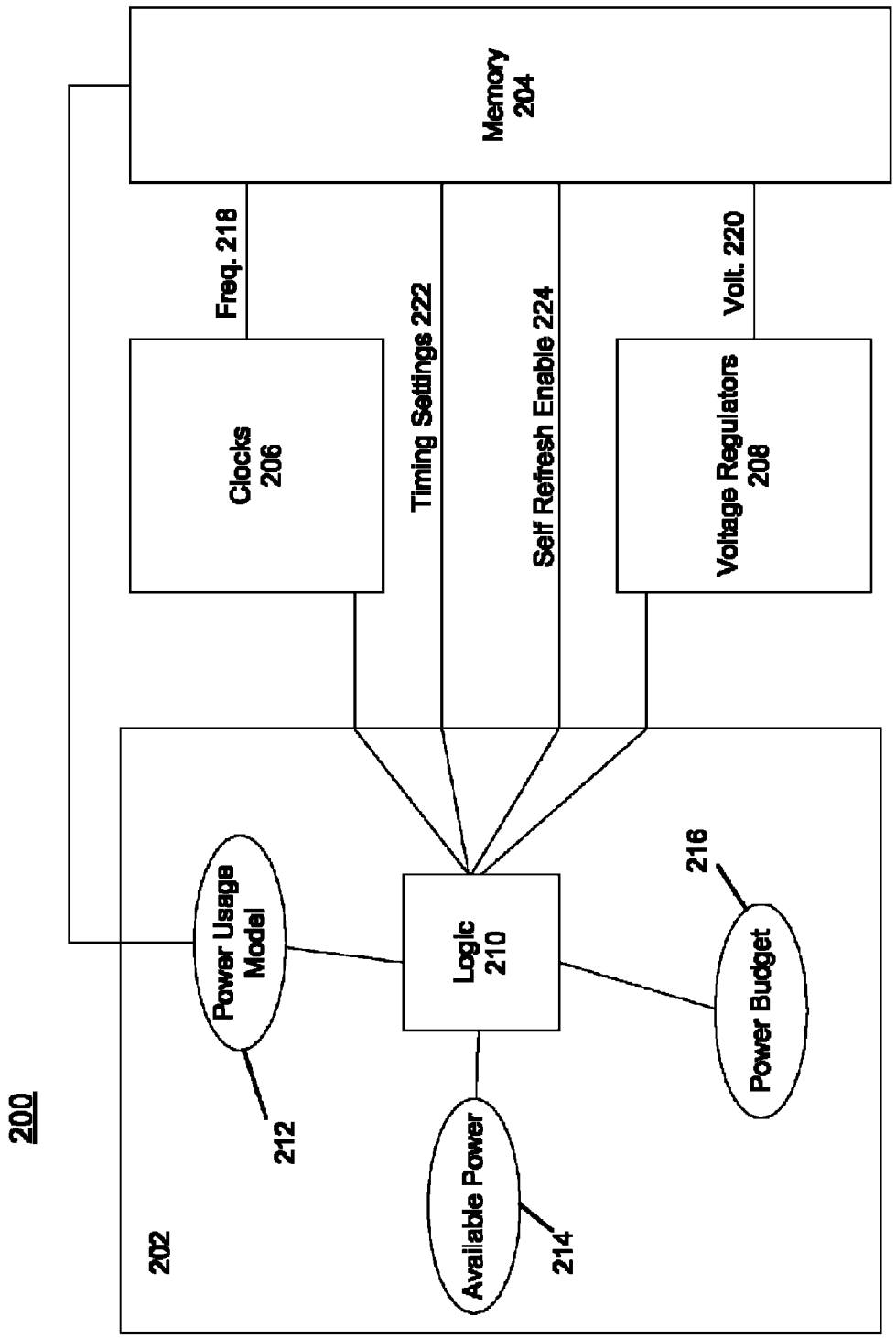
FIG. 2 is a block diagram of another example power manager configuration in accordance with an embodiment of the present invention.

Referring now to FIG. 2, shown is a block diagram of another example power manager configuration in accordance with an embodiment of the present invention. As shown in FIG. 2, configuration 200 may include power manager 202, memory 204, clocks 206 and voltage regulators 208.

Logic 210 may provide power manager 202 with the ability to receive power usage model 212, to determine available power 214 based at least in part on power budget 216 and power usage model 212, and to change a power state of memory 204 based at least in part on available power 214. Power manager 202 and logic 210 may represent hardware or software or a combination of hardware and software.

In one embodiment, power manager 202 may receive power usage model 212 directly or indirectly from memory 204 through current measurements or activity levels. In another embodiment, power usage model 212 represents a calibrated weights estimation computed in real-time and stored in a register. In another embodiment, power usage model 212 represents socket power usage (for example including processor and/or other silicon) and not just memory power usage. Power budget 216 may be fixed for a particular time period or it may be dynamic. In one embodiment, power budget 216 is based on a RAPL algorithm for a given period of time, for example 100 milliseconds.

Power manager 202 may have the ability to change power states of memory 204 based in part on a determined available power 214. In one embodiment, power manager 202 has predetermined power states (for example as shown in FIG. 3) into which power manager 202 may set memory 204 (and processor not shown). In another embodiment, power manager 202 may fine-tune settings independently to affect the power and performance of memory 204. In various embodiments, logic 210 may signal clocks 206 to adjust frequencies 218 supplied to memory 204. In various embodiments, logic 210 may signal voltage regulators 208 to adjust voltages 220 supplied to memory 204. Logic 210 may also, in various embodiments, directly or indirectly, adjust timing settings 222 and self refresh enable 224 to control bandwidth and activity levels of memory 204 or portions thereof. In one embodiment, timing settings 222 may include a column access strobe (CAS) time. In another embodiment, timing settings 222 may include a rank idle timer threshold (for example, tRANKIDLE), wherein after tRANKIDLE clocks have passed with no command given to a rank of DRAM, the rank will be put into a powerdown state. In other embodiments, logic 210 may set control registers, not shown, to implement changes in power state.

Referring now to FIG. 3, shown is a table of example power states used by a power manager in accordance with an embodiment of the present invention. As shown in FIG. 3, table 300 includes a series of RAPL states 302 listed in descending power usage. Each RAPL state 302 defines a P state 304, an H state 306, and a Socket T state 308, for a coordinated processor and memory socket power state. In this example, to achieve lower power RAPL states, P states are first changed, followed by H states and finally Socket T states. However, power states can be changed in different orders or multiple power states can be changed in a single change of RAPL state. Also, while shown as including four P states, four H states and 8 Socket T states, any number of power states may be used. For example, more Socket T states may provide greater granularity in more gradually transitioning portions of memory into a state of self-refresh.

Referring now to FIG. 4, shown is a flow chart of an example method for limiting system power in accordance with an embodiment of the present invention. As shown in FIG. 4, the method begins with the power manager receiving (402) a power usage value 212. In one embodiment, the power usage represents a real-time estimation of memory power. In another embodiment, the power usage represents a system or platform activity level. In another embodiment, the power usage value represents a current measurement. The method continues with the power manager determining (404) an available power 214. In one embodiment, available power is based on power usage 212 and power budget 216. In one embodiment, available power is determined by RAPL algorithm 108 for a given time window, for example 100 milliseconds.

The power manager then determines (406) if a change in power state is required. In one embodiment, a decrease in available power 214 would necessitate a change to a lower power state. In another embodiment, power budget 216 may be exceeded for periods of time if there is a need for greater performance. If a change in power state is required, the power manager may change (408) memory and/or processor power states. In one embodiment, RAPL 108 changes power states according to a table of power states, such as table 300, for example. In another embodiment, logic 210 may dynamically change power usage of memory 204 by adjusting one or more settings or inputs shown in FIG. 2.

Figure 5:
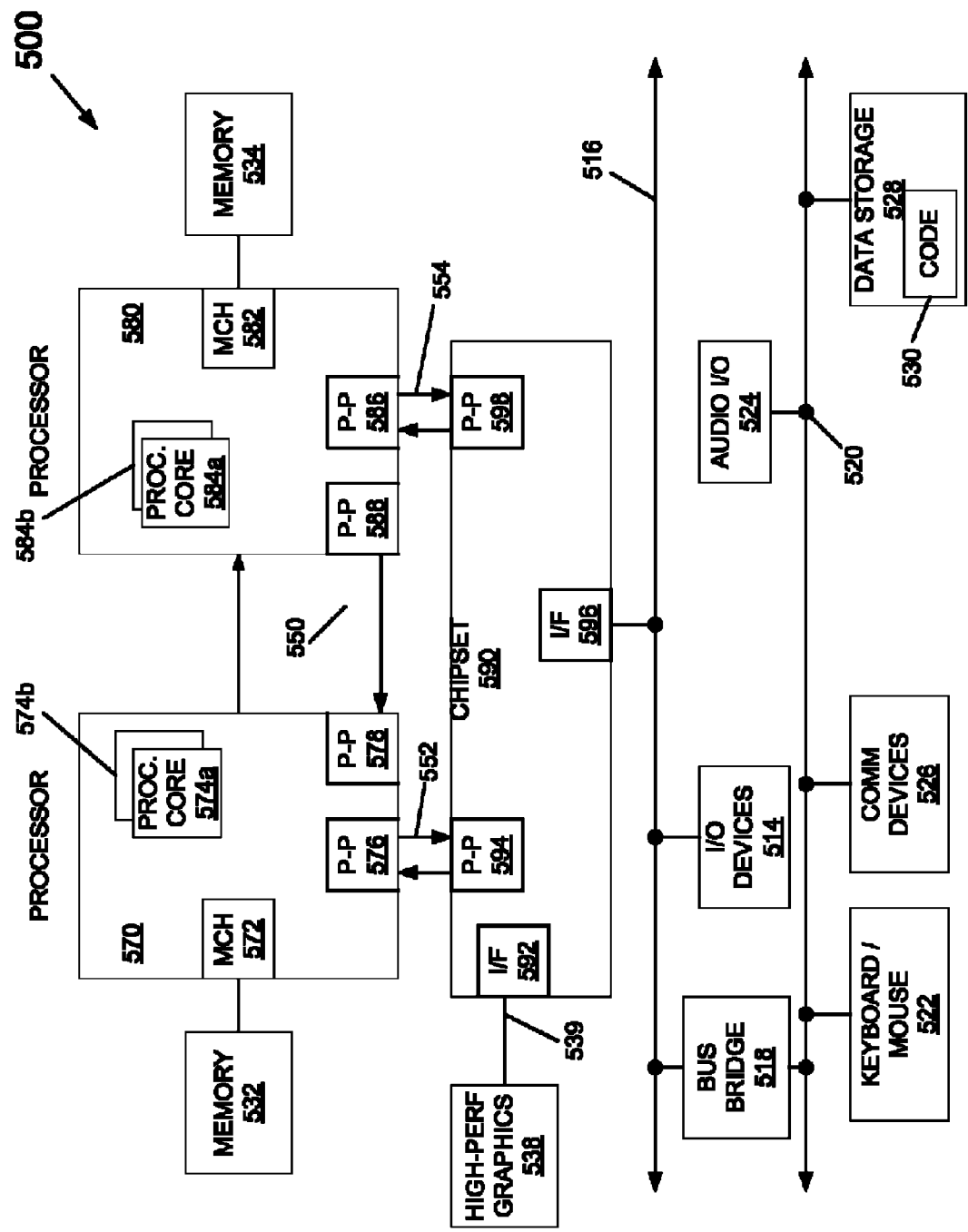
FIG. 5 is a block diagram of an example system in accordance with an embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b). Each processor core may be controllable by a power manager in accordance with an embodiment of the present invention.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of main memory (e.g., a dynamic random access memory (DRAM)) locally attached to the respective processors, each of which may be controllable by a power manager in accordance with an embodiment of the present invention. First processor 570 and second processor 580 may be coupled to a chipset 590 via P-P interconnects 552 and 554, respectively. As shown in FIG. 5, chipset 590 includes P-P interfaces 594 and 598.

Furthermore, chipset 590 includes an interface 592 to couple chipset 590 with a high performance graphics engine 538. In turn, chipset 590 may be coupled to a first bus 516 via an interface 596. As shown in FIG. 5, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A non-transitory storage medium comprising content which, when executed by an accessing machine, causes the accessing machine to:

receive a power value that is determined based on P states that represent a plurality of voltage and frequency level combinations to which a processor may be set, H states that represent a plurality of voltage and frequency level combinations to which ranks within a memory may be set and T states that represent a plurality of energy efficiency levels that throttle functionality of the memory and the processor;

determine an available power based at least in part on a power budget and the power value; and change a memory power state based at least in part on the available power and the power value, wherein the memory power state comprises a memory frequency and a memory voltage by placing only a portion of memory into self refresh.

2. The storage medium of claim 1, wherein the content to determine an available power based at least in part on a power budget and the memory power usage value comprises content to implement a running average power limit (RAPL).

3. The storage medium of claim 1, further comprising content which, when executed by an accessing machine, causes the accessing machine to change memory timing settings.

4. The storage medium of claim 1, further comprising content which, when executed by an accessing machine, causes the accessing machine to change a socket power state which coordinates the memory power state with a processor power state.

5. The storage medium of claim 1, further comprising content which, when executed by an accessing machine, causes the accessing machine to receive a system power usage value.

6. The storage medium of claim 5, further comprising content which, when executed by an accessing machine, causes the accessing machine to change a processor power state.

7. The storage medium of claim 5, wherein the content to receive a system power usage value comprises content to receive calibrated weight estimations.

8. A system comprising:
a processor including a memory controller;
a dynamic random access memory (DRAM) coupled to the processor; and
a power manager to receive a power value that is determined based on P states that represent a plurality of voltage and frequency level combinations to which a processor may be set, H states that represent a plurality of voltage and frequency level combinations to which ranks within a memory may be set and T states that represent a plurality of energy efficiency levels that throttle functionality of the memory and the processor, to determine an available power based at least in part on a power budget and the power value, and to change a memory power state based at least in part on the available power and the power value, wherein the memory power state comprises a memory frequency and a memory voltage by placing only a portion of memory into self refresh.

9. The system of claim 8, wherein the power manager to determine an available power based at least in part on a power budget and the memory power usage value comprises the power manager to implement a running average power limit (RAPL).

10. The system of claim 8, further comprising the power manager to change memory timing settings.

11. The system of claim 10, wherein the power manager to change memory timing settings comprises the power manager to change column access strobe (CAS) timings.

12. The system of claim 8, further comprising the power manager to change a processor power state.

13. A method comprising:
receiving a power value that is determined based on P states that represent a plurality of voltage and frequency level combinations to which a processor may be set, H states that represent a plurality of voltage and frequency level combinations to which ranks within a memory may be set and T states that represent a plurality of energy efficiency levels that throttle functionality of the memory and the processor;

determining an available power based at least in part on a power budget and the power value; and changing a memory power state based at least in part on the available power and the power value, wherein the memory power state comprises a memory frequency and a memory voltage by placing only a portion of memory into self refresh.

14. The method of claim 13, further comprising changing memory timing settings.

15. The method of claim 13, wherein changing memory timing settings comprises changing column access strobe (CAS) timings.

16. The method of claim 13, further comprising receiving a silicon power usage value.

17. The method of claim 16, further comprising changing a processor power state.

18. The method of claim 16, receiving a silicon power usage value comprises receiving calibrated weight estimations.

* * * * *